United States Patent Office 3,431,681
Patented Mar. 11, 1969

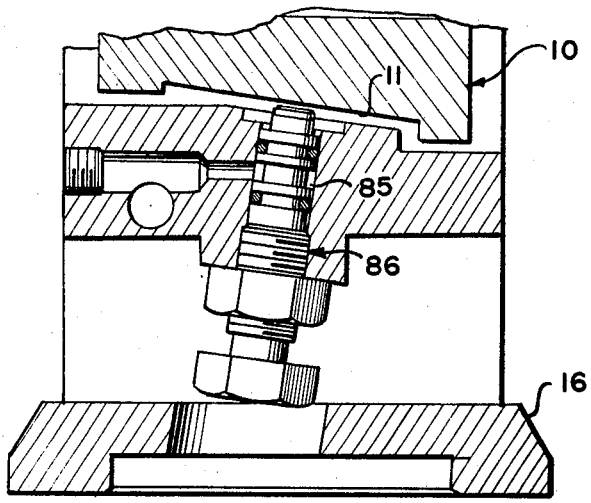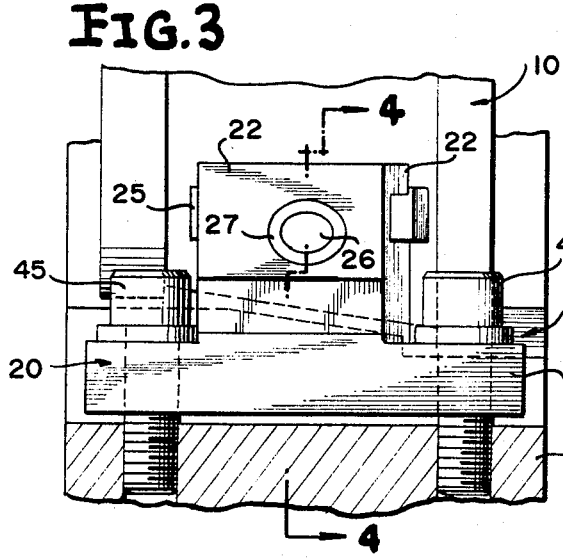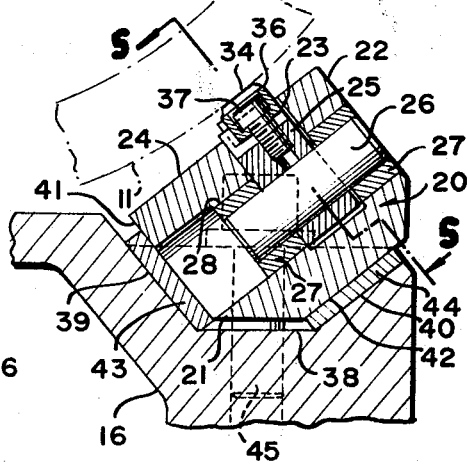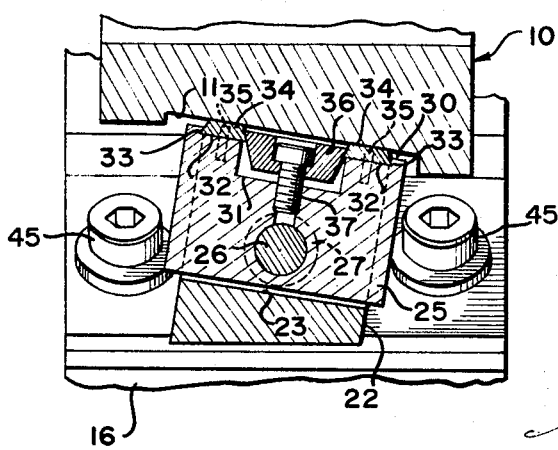

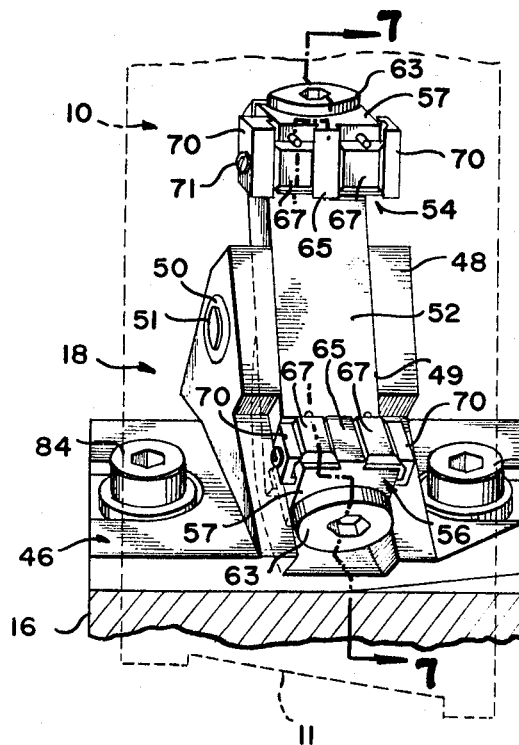

3,431,681
WORK SUPPORT SHOE ASSEMBLY
William P. Flohr, Jr., Waynesboro, Pa., assignor to Landis Tool Company, Waynesboro, Pa., a corporation of Pennsylvania
Filed July 23, 1965, Ser. No. 474,416
U.S. Cl. 51—103                                  15 Claims
Int. Cl. B24b 5/18, 5/00, 29/00

ABSTRACT OF THE DISCLOSURE

The disclosure relates to a grinding machine which is similar to a conventional shoe-type centerless grinder. A workpiece is rotated by a magnetic chuck and radially supported by peripherally spaced shoes with the center of the work in offset relation to the center of a face plate so that the rotating force applied by the face plate to the workpiece holds the workpiece in firm engagement with the supporting shoes. The angle of the surface of the workpiece varies from rough size to finished size. In order to accommodate this change in angle and to provide proper support to the workpiece throughout the grinding operation, the supporting shoes are pivotally mounted on a base member so that they maintain contact across the face of the surface being ground for all angles between that of the rough workpiece and that of the finished workpiece.

---

This invention relates in general to new and useful improvements in work supports, and more particularly to a novel work support shoe assembly particularly adapted for engagement with a generally conical surface of a rotating workpiece to effect the self-centering thereof during a machining operation performed thereon.

This invention particularly relates to a work support for a workpiece which is mounted for self-centering and which is carried by a magnetic chuck with the axis of rotation of the workpiece being offset from the axis of rotation of the magnetic chuck, and wherein a machining operation is being performed on the generally conical surface of the workpiece as the workpiece rotates, the machining operation being preferably in the form of a grinding operation. The rotating workpiece is supported by engagement of the generally conical surface thereof with work support shoes. These work support shoes are formed of a hardened material, such as Carboloy and it is desirable that the work support shoes have a full surface contact with the workpiece surface at all times to effectively support the workpiece and to prevent the tearing out of the work support shoes.

The angle of taper of an unground workpiece is not usually the same as the angle of the finished taper surface. Where the width of the taper is small, the supporting shoe may be only of a single point contact member. However, where the tapered surface is relatively long, a single point contact is not adequate. If a supporting shoe or axially spaced shoes are used for contacting the axially spaced portions of the tapered surface and are rigidly supported as are the conventional single point shoes, the rough unground surface may be engaged by both spaced shoes or by a relatively long single shoe. As the grinding proceeds, the angle of taper of the work may change in accordance with the angle of taper of the grinding wheel so that the rigid mounted supporting shoes are not in contact with the work surface over the full length. This will result in excessive wear on one portion of the supporting shoe and an inadequate support for the workpiece.

It is the primary object of this invention to provide a novel work support shoe assembly which is particularly adaptable to the generally conical surface of the workpiece and wherein work support shoes of the assembly are automatically adjustable to have full surface contact with the workpiece surface.

Another object of this invention is to provide a novel work support shoe assembly which includes a mounting bracket having an axially extending base portion for effecting the mounting of the mounting bracket and a radially projecting central portion which is inclined relative to the base portion, in accordance with the angle of taper of the workpiece surface, and there being carried by the mounting bracket central portion a holder supporting a pair of axially spaced work support shoes, the holder lying generally in a radial plane passing through the axis of rotation of the associated workpiece and being pivotable within that plane to effect an automatic self-positioning of the work support shoes relative to the surface of the workpiece.

Another object of this invention is to provide a novel work support shoe assembly particularly adapted for use in the automatic supporting and self-centering of a rotating workpiece having a generally conical surface, the work shoe assembly including a mounting bracket having an axially extending base portion and a radially projecting central portion, the central portion being inclined with respect to the base portion at an angle corresponding generally to the angle of taper of the surface of the workpiece, and there being pivotally carried by the mounting bracket central portion a support bar which extends generally tangentially to the path of rotation of the workpiece surface and which is pivotable about an axis disposed substantially parallel to a radially adjacent portion of the path of movement of the workpiece conical surface, and there being carried by opposite ends of the support bar holders, each holder having a pair of axially spaced work support shoes and each holder being disposed in a radial plane and being pivotable in that plane whereby the work support shoes carried by each holder will automatically adjust to the surface of a workpiece.

Another object of this invention is to provide a novel work support shoe unit which includes a holder having mounted on one face thereof two transversely extending work support shoes, the work support shoes being removably clamped to the face of the holder and being transversely fixed, and the holder having a pivot pin receiving bore extending transversely therethrough with the axis of the bore being parallel to the face of the holder on which the support shoes are mounted.

A further object of this invention is to provide a novel apparatus for grinding a conical surface of a workpiece rotating about an axis which is shiftable in accordance with the grinding of the workpiece conical surface, the apparatus including a base underlying the axis of the rotation of the workpiece, a magnetic chuck having a center of rotation offset toward one side of the axis of rotation and being in sliding engagement with one end of the workpiece to effect the rotation thereof, a grinding wheel disposed at the opposite side of the axis of rotation for effecting a grinding operation on the conical surface of the rotating workpiece, and a plurality of pairs of work support shoes carried by said base for automatically centering and supporting the workpiece during the grinding thereof, the work support shoes including first and second work support shoes carried by a common support at the one side of the axis generally in opposition to the grinding wheel, and a third work support shoe disposed at the outer side of the axis below the grinding wheel, the work support shoe being carried by individual holders each of which is pivotally mounted and lies in a radial plane with the work support shoes being automatically adjustable to the contour of the surface of the workpiece and the arrangement of the work support shoes providing for the automatic centering of the workpiece during the grinding operation.

With the above and other objects in view that will hereinafter appear, the nature of the invention will be more clearly understood by reference to the following detailed description, the appended claims and the several views illustrated in the accompanying drawings.

In the drawings:

FIGURE 2 is a fragmentary vertical sectional view taken along the line 2—2 of FIGURE 1 and shows more specifically the details of a jet sizing device.

FIGURE 3 is a longtiudinal sectional view taken along the line 3—3 of FIGURE 1 and shows the general details of one work support shoe assembly and the relationship thereof with respect to the workpiece being ground.

FIGURE 4 is a fragmentary transverse vertical sectional view taken along the line 4—4 of FIGURE 3 and shows specifically the relationship of a holder of the assembly with respect to the mounting bracket supporting the holder for pivotal movement.

FIGURE 5 is a longitudinal sectional view taken generally along the line 5—5 of FIGURE 1 and shows more specifically the details of the holder and the work support shoes carried thereby, there also being illustrated the specific details of the mounting bracket and the relationship of the holder with respect thereto.

FIGURE 6 is an elevational view of the other work support shoe assembly of the apparatus with the view being generally taken along the line 6—6 of FIGURE 1, and the workpiece outline being shown in phantom lines.

FIGURE 7 is a transverse vertical sectional view taken generally along the line 7—7 of FIGURE 6 and shows specifically the details of construction of the second work support shoe assembly.

FIGURE 8 is a generally horizontal sectional view taken along the line 8—8 of FIGURE 7 and shows the specific details of one of the work support shoe units and the relationship thereof with respect to the remainder of the work support shoe assembly.

Figure 1:
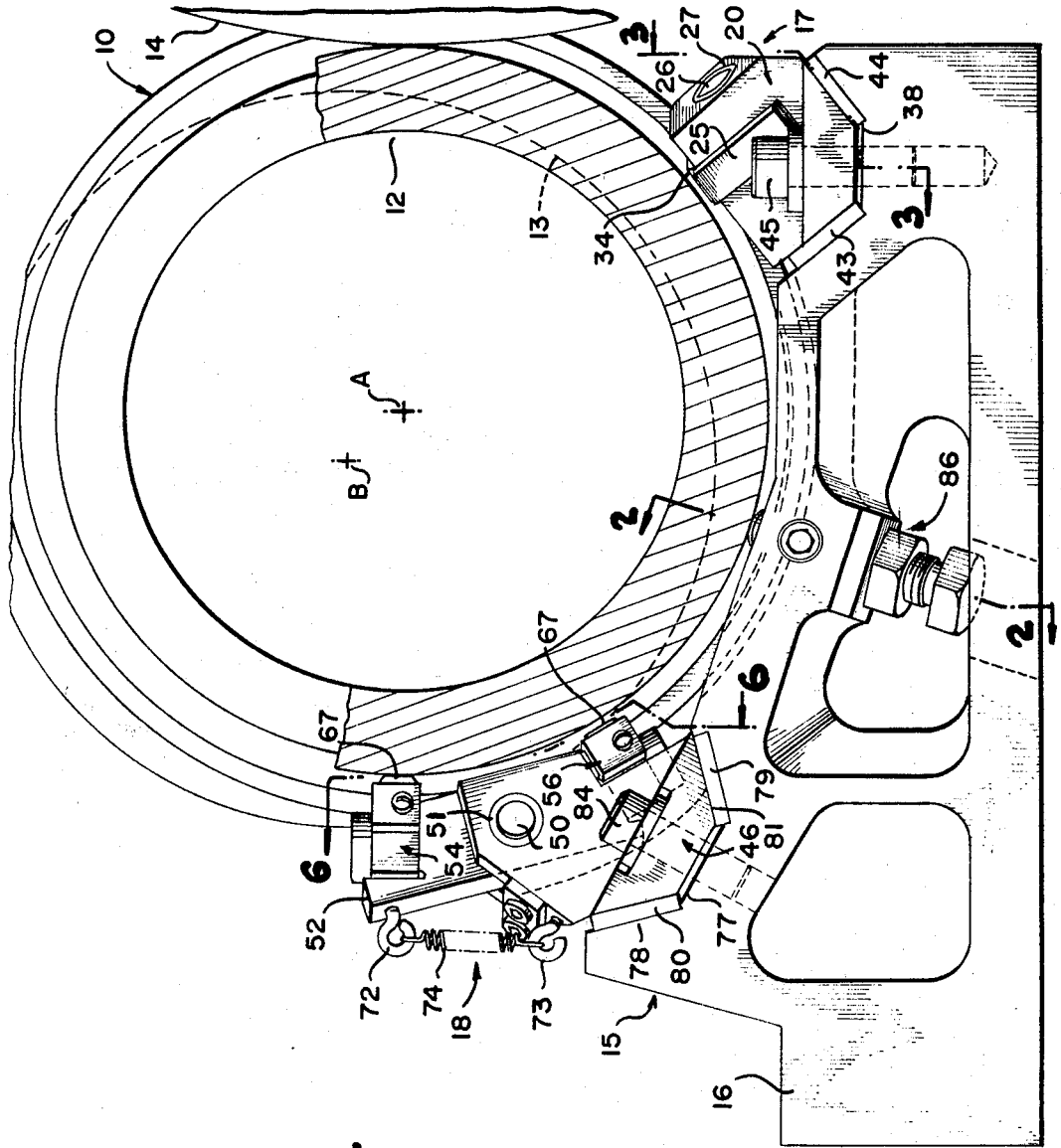
FIGURE 1 is an end elevation view of the apparatus formed in accordance with this invention and shows the specific relationship of the apparatus with respect to a workpiece, the workpiece having a lower end portion thereof broken away and shown in section for purpose of clarity.

Referring now to the drawings in detail, it will be seen that there is illustrated in FIGURES 1 and 2 the specific outline of a workpiece on which grinding operations are to be performed in accordance with this invention. The workpiece is generally referred to by the numeral 10 and is of a circular cross section. The workpiece 10 has a tapered central outer surface portion 11, which will be described hereinafter as being generally conical, which is to be ground. The workpiece 10 may also have a bore 12 therethrough. The workpiece 10 is concentric about an axis A which appears in FIGURE 1. It is about this axis that the workpiece 10 is rotated during the performing of a grinding operation.

The workpiece 10, during the grinding operation, is supported by a magnetic chuck 13 of a conventional type. The magnetic chuck 13 includes a face plate to which one end of the workpiece 10 is magnetically attracted. While the workpiece 10 is fixedly secured to the magnetic chuck 13 against axial movement, it is to be understood that it will have a relative transverse sliding connection with the magnetic chuck. The magnetic chuck 13 has an axis of rotation defined by the letter B in FIGURE 1. It is to be noted that the axis of rotation B is offset above and to the left from the axis of the rotation A.

The grinding operation on the workpiece 10 is performed by means of a grinding wheel 14. The grinding wheel 14, of which only a portion is shown in FIGURE 1, is disposed at the opposite side of the axis A from the axis B and has a center of rotation (not shown) disposed along the same general horizontal plane as the axis A. It is to be understood that the grinding wheel 14 will be moved into and out of engagement with the workpiece 10 during a grinding operation. It is also to be understood that the grinding wheel 14 is suitably contoured to provide for the desired shaping of the exterior surface of the workpiece 10.

Although the magnetic chuck 13 serves to actually position the workpiece 10 and to effect the rotation thereof, it does not define the path of rotation of the workpiece 10. In order that the workpiece 10 may be accurately supported during the grinding operation, there is provided a support assembly which is generally referred to by the numeral 15. The support assembly 15 includes a base 16 which may be mounted on a frame structure of a grinding machine in any desired manner. The base 16 has supported therefrom two work support shoe assemblies 17 and 18. The work support shoe assembly 17 is disposed to the right of the axis A and is generally below the grinding wheel 14, as is clearly shown in FIGURE 1. The work support shoe assembly 18 is disposed to the left of the axis A and generally in opposition to the grinding wheel 14, as is also best shown in FIGURE 1.

Referring now to FIGURES 3, 4 and 5 in particular, it will be seen that the work support shoe assembly 17, includes a mounting bracket which is generally referred to by the numeral 20. The mounting bracket 20 includes an axially extending base portion 21 and a central portion 22. The central portion 22 extends upwardly and generally radially from the base portion 21. As is clearly shown in FIGURES 3 and 5, the central portion 22 is not disposed normal to the axis of the base portion 21, but is at a slight angle to the normal. It may be said that the central portion 22 is inclined with respect to the base portion 20.

The central portion 22 is of a bifurcated construction and has a recess 23 formed therein. The recess 23 opens radially out of the central portion 22 through a face 24 of the central portion which is generally parallel to a plane extending parallel to and tangential to the adjacent portion of the surface 11 of a workpiece 10.

A holder 25 is seated in the recess 23 and carries a pivot pin 26. The pivot pin 26 is rotatably journalled in sleeve bearings 27 which are suitably seated in a bore 28 formed in the central portion 22. It is to be noted that the axis of the bore 28 is parallel to the face 24 and thus the axis of the pivot pin 26 is disposed parallel to a tangent to a radially adjacent portion of the surface 11. Thus, the holder 25 lies in a radial plane and is rockable in that plane.

Referring now to FIGURE 5 in particular, it will be seen that the outline of the holder 25 is that of a rectangular block. The block 25 has a face 30 which opposes the surface 11 of the workpiece. The face 30 has a large central recess 31 formed therein and is recessed more shallowly on opposite sides of the recess 31 to define a pair of seats 32. The outer side edges of the seats 32 are defined by undercut surfaces 33. Each of the seats 32 has seated thereon a work support shoe 34. The work support shoes 34 extend transversely of the face 30 and have at least the lower portions thereof of a dovetail configuration. The shoes 34 are positioned transversely of the holder 25 by means of dowel pins 35. The two shoes 34 are clamped in place by means of a single clamp block 36 having tapered side surfaces which are complementary to the side surfaces of the shoes 34. The clamp block 36 is secured in place by means of a screw 37 which passes therethrough and is threaded into the holder 25. It will be seen that the clamp block 36 wedges the two shoes 34 into engagement with and beneath the undercut surfaces 33 to fixedly retain the shoes in place.

It will be readily apparent from FIGURES 3, 4 and 5 that due to the twisted relation of the central portion 22 with respect to the base portion 21 of the mouning bracket 20, the normal position of the holder 25 is one wherein the shoes 34 are properly presented for full engagement with the surface 11 of the workpiece 10. However, the shoes 34 are automatically self-aligning with the surface 11 either because of any initial irregularities in the surface 11 or as the contour of the surface 11 changes during a grinding operation. Thus, the workpiece 10 smoothly rides on the shoes 34 in supported relation with the shoes 34 cooperating to define the path of rotation of the workpiece 10. It is understood that due to the smooth riding of the surface 11 of the workpiece 10 on the shoes 34, there is no marring of the workpiece surface 11 nor is there any tendency for the shoes to be broken or torn from the holder 25. It is to be understood that the shoes 34 may be fomed of a suitable hard material such as Carboloy.

Referring now to FIGURES 1 and 4 in particular, it will be seen that the right side of the base 16 is provided with an axially extending seat 38 which is generally in the form of a V-groove, as is best shown in FIGURE 4. The seat 38 includes two opposed, downwardly converging surfaces 39 and 40. The base portion 21 of the mounting bracket 20 is also of a generally V cross section and has downwardly sloping side surfaces 41 and 42 which are disposed in parallel relation to the surfaces 39 and 40, respectively. The mounting bracket 20 is adjusted both vertically and transversely with respect to the base 16 by means of shim strips 43 and 44 disposed between the seat 38 and the base portion 21. The mounting bracket 20 is clamped in an adjusted position in the seat 38 by means of a pair of spaced bolts 46 which are threaded into the base 16.

Referring now to FIGURES 6, 7 and 8 in particular, it will be seen that there are illustrated the details of the work support shoe assembly 18. The work support shoe assembly 18 includes a mounting bracket which is generally referred to by the numeral 46. The mounting bracket 46 includes an axially or longitudinally extending base portion 47 and a bifurcated central portion 48 which extends radially upwardly away from the base portion 47. The central portion 48 has a central recess 49 which opens towards the workpiece 10 and the general plane thereof is generally normal to the axis A as opposed to extending generally parallel thereto as in the case of the recess 23 of the mounting bracket 20.

It is to be noted that the central portion 48 is also disposed in angular relation relation to the base portion 47 other than a 90 degree angle. This angular relation or twisting of the central portion 48 with respect to the base portion 47 permits the general plane of the recess 49 to be substantially normal to a radially adjacent portion of the surface 11 of the workpiece, as is generally shown in FIGURE 8.

The central portion 48 is provided with sleeve bearings or bushings 50 on opposite sides of the recess 49. The sleeve bearings 50 receive a pivot pin or shaft 51 having an axis disposed parallel to a radially adjacent portion of the surface 11 of the workpiece. The pivot pin 51 supports a support bar 52 for pivotal movement relative to the central portion 48. The support bar 52 is partially seated in the recess 49 and projects both vertically and radially outwardly therefrom, as is clearly shown in FIGURE 7.

The uppper end of the support bar 52 is provided with a notched recess 53 in which there is supported for pivotal movement a first work support shoe unit which is generally referred to by the numeral 54. The lower end of the support bar 52 is also provided with a notched recess 55 in which there is seated for relative pivotal movement a work support shoe unit which is generally referred to by the numeral 56. The work support shoe units 54 and 56 are identical and each includes a generally rectangular holder 57. Each holder 57 is pivotally secured to the support bar 52 by means of a pivot pin 58 which has a threaded end portion 60 suitably secured in the support bar 52. The pivot pin 58 has a smooth central portion 61 which is journalled in a sleeve bearing 62 carried by the holder 57. The pivot pin 58 also has an enlarged head 63 at the end thereof remote from the threaded end portion 60. The head 63 retains the associated holder 57 in its respective recess.

Each of the holders 57 is generally rectangular in outline and may be considered to be in the form of a generally rectangular block. Each holder 57 has a face 64 which opposes the workpiece 10 being ground. As is clearly shown in FIGURE 8, the face 64 is transversely recessed to define a central rib 65 and a pair of seats 66, the ribs 65 and the seats 66 extending transversely of the face 64 and generally circumferentially of the workpiece 10. It is to be noted that the opposite sides of the ribs 65 are undercut. In each of the seats 66 there is positioned a work support shoe 67. Each work support shoe 67, which is of the same construction as the work support shoes 34, has a reduced end portion 68 which is pinned to the holder 57 by means of a dowel pin 69. In this manner the work support shoes 67 are fixed against movement circumferentially of the workpiece 10 relative to the holders 57.

Each work support shoe 67 is also secured to its associated holder 57 by means of a clamp 70. The clamps 70 are disposed on opposite sides of the holder 57 and are retained in place by means of fasteners 71 threaded into the holder 57. It is to be noted that the clamps 70 tightly clamp the work support shoes 67 against the seats 66 and beneath the undercuts of the ribs 65.

Referring once again to FIGURE 7 in particular, it will be seen that although the two work support shoe units 54 and 56 are carried by the common support bar 52, due to the fact that the pivot pins 58 for the two work support shoe units are disposed in angular relation, the two work support shoe units 54 and 56 lie in different planes. Each of the work support shoe units 54 and 56 lies in a radial plane and is pivotable about its associated pivot pin 58 in that radial plane. Because of this particular mounting of the work support shoe units 54 and 56, the work support shoes 67 thereof are automatically self-adjusting to have full engagement with the surface 11 of the workpiece 10.

It is to be noted that due to the pivotal mounting of the support bar 52, the work support shoe units 54 and 56 will automatically assume centered positions. In order to facilitate the automatic centering of the work support shoe units 54, and support bar 52 is spring loaded in a counterclockwise direction, as viewed in FIGURE 7. This is accomplished by means of a hook 72 attached to the upper end of the support bar 52 and a hook 73 attached to the mounting bracket 46. The tension spring 74 extends between the two hooks 72 and 73. The central portion 48 of the mounting bracket has extending across the upper outer portion thereof a stop bar 75 which is engageable by the support bar 52 to limit the pivoting thereof in a counterclockwise direction. The stop bar 75 is secured in place bridging the recess 49 by means of fasteners 76.

Referring now to FIGURES 1 and 7 in particular, it will be seen that the base 16 has a second axially or longitudinally extending seat 77 formed therein. The seat 77 is of the same construction as the seat 38 and is generally V-shaped in cross section. The seat 77 has two downwardly converging side surfaces 78 and 79 which oppose like surfaces 80 and 81 respectively on the base portion 47 of the mounting bracket 46, the base portion 47 being also generally V-shaped in cross section. The mounting bracket 46 is adjusted both vertically and transversely with respect to the base 16 by means of shims 82 and 83 which are disposed between the seat 77 and the base portion 47.

Referring now to FIGURES 6 and 8 in particular, it will be seen that the mounting bracket 46 is clamped in an adjusted position on the base 16 by means of bolts or cap screws 84 which pass down through the base portion 47 and are threadedly engaged in the base 16. Due to the fact that the work support shot assemblies 17 and 18 are secured to the base 16 by only two fasteners each, it will be readily apparent that the work support shoe assemblies may be readily interchanged for different workpieces.

Referring now to FIGURES 1 and 2 in particular, it will be seen that the base 16 is provided with a bore 85 in the upper portion thereof. The bore 85 is disposed in a radial plane and has an axis disposed normal to the surface 11. The bore 85 has seated therein a conventional jet sensing or gauging element which is referred to by the numeral 86. It is to be understood that the gauging or sensing element 86 directs a stream of fluid under pressure onto the surface 11 and the back pressure on the fluid due to the reaction of the fluid against the surface 11 is utilized in controlling the operation of the apparatus. Inasmuch as the sensing or gauging element 86 is conventional, it will not be described in more detail here.

OPERATION

In accordance with this invention, the workpiece 10 is automatically positioned in the support assembly 15 and engaged with the magnetic chuck 13 in a conventional manner. The magnetic chuck 13 effects the rotation of the workpiece 10 and firmly seats it on the work support shoes of the work support shoe assemblies 17 and 18. The grinding wheel 14 is then fed into engagement with the workpiece. As the grinding wheel 14 effects a grinding operation on the surface 11 of the workpiece 10, the workpiece 10 shifts slightly to the left and slightly downwardly with the axis A shifting in the same manner. This shifting is very slight and has not been shown. During this movement of the workpiece 10, the shoes will automatically adjust so as to firmly support the workpiece 10 for rotation in the predetermined relation with respect to the grinding wheel 14. When the surface 11 has been ground to the predetermined size, the gauging device 86 will automatically effect the withdrawal of the grinding wheel 14 and the removal of the ground workpiece 10, followed by the positioning of another workpiece to be ground.

Although the support assembly 15 has been specifically described with relation to a specific workpiece 10, it is to be understood that the invention is not so limited. The support assembly 15 may be modified from a design standpoint to receive other workpieces having tapered or generally conical surfaces.

Although only a preferred embodiment of the invention has been specifically illustrated and described herein, it is to be understood that minor modifications may be made in the apparatus without departing from the spirit and scope of the invention, as defined by the appended claims.

I claim:
1. A work support shoe assembly for engaging a work surface having a predetermined general path of movement which changes in angular relation to its axis during grinding, said assembly comprising peripherally spaced work engaging members each adapted for engaging a workpiece surface at at least two axially spaced points, and means mounting each work supporting member for independent oscillation about a pivot in a plane extending generally radially from an intended axis of rotation of said workpiece, whereby said work supporting members will automatically individually adjust during grinding to maintain contact with axially spaced points on the workpiece surface, said holders being carried by a common support mounted for pivotal movement about an axis disposed intermediate said holders and substantially parallel to a radially adjacent portion of said path of movement.

2. A support for a workpiece rotating generally about a predetermined axis and having a circular cross section surface with the workpiece surface having a predetermined general path of movement, said support comprising a base, a pair of holders spaced circumferentially about said axis, at least one work support shoe carried by each holder, each of said holders lying within a plane extending substantially radially from said axis, and means carried by said base mounting each holder for independent pivotal movement relative to said base in the respective radial plane of each holder for the self-positioning of said work support shoes, said holders being carried by a common support mounted for pivotal movement about an axis disposed intermediate said holders and substantially parallel to a radially adjacent portion of said path of movement.

3. A support for a workpiece rotating generally about a predetermined axis and having a circular cross section surface with the workpiece surface having a predetermined general path of movement, said support comprising a base, first and second adjacent holders spaced circumferentially about said axis disposed at one side of said base and a third holder mounted at the other side of said base, at least one work support shoe on each holder, each of said holders lying within a plane extending substantially radially from said axis, and means carried by said base mounting each holder for independent oscillatory movement relative to said base in the respective radial plane of each holder for the self-positioning of said work support holder.

4. The support of claim 3 wherein said first and second holders are carried by a common support mounted for pivotal movement about an axis disposed intermediate said holders and substantially parallel to a radially adjacent portion of said path of movement.

5. A support for a workpiece rotating generally about a predetermined axis and having a circular cross section surface with the workpiece surface having a predetermined general path of movement, said support comprising a base, an axially extending seat at each side of said base, a pair of brackets, each of said brackets including an axially extending base portion seated in a respective one of said seats and a radially projecting central portion inclined relative to said base portion and lying generally in a plane disposed normal to a radially adjacent part of said path of movement, a holder carried by each bracket, at least one work support shoe on each holder, and means pivotally mounting each of said holders for movement in a plane extending generally radially from said axis to provide for the automatic adjustment of said work support shoes to the surface of a workpiece.

6. A support for a workpiece rotating generally about a predetermined axis and having a circular cross section surface with the workpiece surface having a predetermined general path of movement, said work support comprising a base, an axially extending seat at each side of said base, a pair of brackets, each of said brackets including an axially extending base portion seated in a respective one of said seats and a radially projecting central portion inclined relative to said base portion and lying generally in a plane disposed normal to a radially adjacent part of said path of movement, a first holder pivotally mounted on one of said brackets and a support bar pivotally carried by the other of said brackets, second and third holders pivotally mounted on said support bar, each of said holders having at least one work support shoe thereon, and all of said holders being pivotable in a plane extending generally radially from said axis to provide for the automatic adjustment of said work support shoes to the surface of a workpiece.

7. An apparatus for machining of a relatively short axial length and having a changing circular cross sectional surface about an axis shiftable in accordance with the machining of the workpiece surface and wherein the angular relationship of the workpiece surface to said axis is subject to change during the machining of the workpiece, said apparatus comprising a base underlying said axis, a magnetic chuck having a center of rotation, said axis being offset to one side of said center of rotation and said chuck being adapted to have sliding driving engagement with one end of a workpiece to effect the rotation thereof, a machine tool element disposed at the opposite side of said axis for machining the surface of a rotating workpiece, and support means carried by said base and engageable with the surface of a workpiece being machined to effect the self-centering of the workpiece, said support means including a pair of holders disposed in circumferentially spaced relation at said one side generally in opposed relation to said machine tool element and at least one other holder disposed at said other side below said machine tool element, each of said holders lying generally in a plane extending radially from said axis and having at least one work support shoe, and means pivotally mounting each holder for movement in its respective radial plane to provide for the automatic adjustment of said work support shoes to the surface of a workpiece in an axial direction.

8. The apparatus of claim 7 wherein said pair of holders are mounted on a common support mounted for pivotal movement about an axis disposed in the same general angular relation to said axis as the intended workpiece surface.

9. The apparatus of claim 7 wherein the apparatus is particularly adapted to machine a conical workpiece of a predetermined angle of taper and said one other holder is carried by a bracket having an axially extending base portion and a radially projecting central portion inclined relative to said base portion at an angle corresponding to the angle of taper, workpiece surface of the intended workpiece, and the pivoting of said one other holder being about an axis having a like inclined relation to said base portion and being disposed parallel to a tangent to a radially adjacent portion of a predetermined general path of movement of a workpiece surface.

10. The apparatus of claim 7 wherein the apparatus is particularly adapted to machine a conical workpiece of a predetermined angle of taper and said pair of holders are mounted on a common support mounted for pivotal movement about an axis generally parallel to a radially adjacent portion of a predetermined general path of movement of a workpiece surface, said common support being carried by a bracket having an axially extending base portion and a radially projecting central portion inclined relative to said base portion at an angle corresponding to the angle of taper of the conical surface and the pivoting of said common support being about an axis lying in a plane extending generally radially from said axis and parallel to the portion of a predetermined general path of movement of a workpiece surface lying in said radial plane.

11. The apparatus of claim 10 wherein the pivoting of each holder of said pair of holders is about the axis of a pin carried by said common support and disposed substantially parallel to a tangent to a radially adjacent portion of the path of movement of a workpiece surface.

12. A support unit for the self-centering of a workpiece for rotation about an axis wherein the workpiece has a generally conical surface of a predetermined taper, said support unit comprising a bracket having an axially extending base portion and a radially projecting central portion inclined relative to said base portion at an angle corresponding to the angle of taper, a holder having at least one work support shoe, and a pivot pin carried by said bracket central portion pivotally mounting said holder, the axis of said pivot pin having a like inclined relation to said base portion and being disposed parallel to a tangent to a radially adjacent portion of a predetermined general path of movement of a workpiece surface.

13. A support unit for the self-centering of a workpiece for rotation about an axis wherein the workpiece has a generally conical surface of a predetermined taper, said support unit comprising a bracket having an axially extending base portion and a radially projecting central portion inclined relative to said base portion at an angle corresponding to the angle of taper, a support bar, a pivot pin carried by said bracket central portion pivotally mounting said support bar, the axis of said pivot pin being parallel to a radial adjacent portion of a predetermined general path of movement of a rotating workpiece conical surface, and a pair of holders carried by said support bar, each of said holders carrying a pair of axially spaced work support shoes, each of said holders being mounted on a pivot pin having an axis disposed substantially parallel to a tangent to a radially adjacent portion of the path of movement.

14. A work support shoe unit comprising a holder having mounted on one face thereof a transversely extending work support shoe, and said holder having a pivot pin extending transversely therethrough with an axis parallel to said one face, said work support shoe having a dovetailed cross sectional lower portion, said holder one face having a seat for said work support shoe including one transversely extending undercut side edge, and a removable clamping element carried by said holder having an undercut surface opposing said undercut side edge.

15. The work support shoe unit of claim 14 wherein said work support shoe has a pin and socket connection with said holder transversely positioning said shoe on said holder.

References Cited

UNITED STATES PATENTS 2,949,708    8/1960    Wiatt _____ 51—238 X

FOREIGN PATENTS 604,964    11/1834    Germany.

HAROLD D. WHITEHEAD, Primary Examiner.

U.S. Cl. X.R.

51—236, 238